United States Patent
Belardinelli et al.

(10) Patent No.: US 10,322,877 B2
(45) Date of Patent: Jun. 18, 2019

(54) PRODUCTION LINE COMPRISING ONE OR MORE ASSEMBLING STATIONS AND AT LEAST ONE MODULE FOR CARRYING CONTAINERS

(71) Applicant: Comau S.p.A., Grugliasco (Turin) (IT)

(72) Inventors: Simone Belardinelli, Grugliasco (IT); Ugo Ghirardi, Grugliasco (IT)

(73) Assignee: Comau S.p.A., Grugliasco (Turin) (IT)

( * ) Notice: Subject to any disclaimer, the term of this patent is extended or adjusted under 35 U.S.C. 154(b) by 0 days.

(21) Appl. No.: 15/881,961

(22) Filed: Jan. 29, 2018

(65) Prior Publication Data
US 2018/0215541 A1    Aug. 2, 2018

(30) Foreign Application Priority Data

Jan. 30, 2017    (IT) ................. 102017000009893

(51) Int. Cl.
| | |
|---|---|
| *B23Q 7/10* | (2006.01) |
| *B65G 1/12* | (2006.01) |
| *A47B 49/00* | (2006.01) |
| *B65G 1/127* | (2006.01) |
| *B65G 17/12* | (2006.01) |
| *B65G 17/18* | (2006.01) |

(Continued)

(52) U.S. Cl.
CPC .............. *B65G 1/12* (2013.01); *A47B 49/002* (2013.01); *A47B 49/008* (2013.01); *B65G 1/127* (2013.01); *B65G 17/123* (2013.01); *B65G 17/18* (2013.01); *B65G 17/34* (2013.01); *B65G 41/008* (2013.01); *B23Q 7/10* (2013.01); *B65G 2201/02* (2013.01); *Y10S 901/01* (2013.01)

(58) Field of Classification Search
CPC .. A47B 49/002; A47B 49/008; B65G 41/008; B65G 17/34; B65G 1/127; B65G 1/12; B65G 17/123; B65G 2201/02; B65G 17/18; B65G 17/48; Y10S 901/01; B23Q 7/10
USPC ........................................... 198/800
See application file for complete search history.

(56) References Cited

U.S. PATENT DOCUMENTS 3,575,281 A  *  4/1971  Sutton ................... B65G 17/48
                                                    198/800
3,664,482 A  *  5/1972  Kornylak ............. B65G 17/123
                                                    198/802

(Continued)

FOREIGN PATENT DOCUMENTS

| CH | 663882 A5 | 1/1988 |
|---|---|---|
| DE | 2431398 A1 | 1/1976 |

(Continued)

*Primary Examiner* — Mark A Deuble
(74) *Attorney, Agent, or Firm* — Young Basile Hanlon & MacFarlane, P.C.

(57) ABSTRACT

A production line comprises one or more assembling stations and at least one module for carrying containers for supplying to the assembling stations parts which are necessary during the execution of a working cycle. In one example, the module includes a paternoster conveying system including a plurality of drawings for containing the parts. The module includes two endless lateral chains and two lateral guide rails engaged with each drawer. The paternoster system and guide rails selectively position the drawers to downwardly angularly rotate toward the workstation when facing the workstation to increase ergonomic access to the parts for the assembling station operator.

11 Claims, 13 Drawing Sheets

(51) Int. Cl.
 *B65G 17/34* (2006.01)
 *B65G 41/00* (2006.01)

(56) References Cited

U.S. PATENT DOCUMENTS

| | | | | |
|---|---|---|---|---|
| 4,421,227 A | * | 12/1983 | Kornylak | B65G 17/18 |
| | | | | 198/800 |
| 6,854,815 B1 | | 2/2005 | Smith | |
| 2004/0149541 A1 | * | 8/2004 | Sauer | B65G 1/127 |
| | | | | 198/347.2 |
| 2004/0235397 A1 | * | 11/2004 | Lack | B65G 1/127 |
| | | | | 451/41 |
| 2014/0291265 A1 | * | 10/2014 | Ou | B65G 1/127 |
| | | | | 211/121 |

FOREIGN PATENT DOCUMENTS

| | | |
|---|---|---|
| DE | 3539115 A1 | 5/1987 |
| DE | 8811524 U1 | 2/1989 |
| DE | 102006061423 A1 | 6/2008 |
| EP | 0458722 B1 | 7/1994 |
| EP | 2757059 A1 | 7/2014 |
| EP | 3241646 A1 | 11/2017 |
| JP | S4945270 A | 4/1974 |
| JP | S4956376 A | 5/1974 |
| JP | S56142637 U | 10/1981 |
| JP | H0648516 A | 2/1994 |
| JP | 2006320990 A | 11/2006 |
| JP | 2011207615 A | 10/2011 |
| JP | 2012196752 A | 10/2012 |
| WO | 9215510 A1 | 9/1992 |

* cited by examiner

PRODUCTION LINE COMPRISING ONE OR MORE ASSEMBLING STATIONS AND AT LEAST ONE MODULE FOR CARRYING CONTAINERS

CROSS-REFERENCE TO RELATED APPLICATIONS

This application claims priority benefit to Italian Patent Application No. 102017000009893 filed Jan. 30, 2017, the entire contents of which is incorporated by reference.

TECHNICAL FIELD

The present invention relates to a production line, comprising one or more assembling stations and at least one module for carrying containers for supplying to the assembling stations parts or components which are necessary during the execution of a working cycle in said assembling stations, wherein said at least one module for carrying containers is provided of a plurality of containers for carrying parts.

BACKGROUND

An example of a module for carrying containers of the type indicated above is for example described in documents EP0458722A1 and U.S. Pat. No. 6,854,815B1.

SUMMARY

The object of the present invention is to provide a production line with at least one module for carrying containers for supplying parts to assembling stations which ensures high efficiency with which the operators are supplied with the parts and components which are necessary for them during the execution of a working cycle and which improves the distribution logistic of said parts to the different assembling stations.

A further object is to provide a production line of the type indicated above which is further advantageous from the standpoint of the ergonomics, enabling the operators to work always in comfortable and convenient conditions, without the need to assume postures or make efforts that are physically challenging for the operators over time.

A further object of the present invention is to provide a production line with at least one module for carrying containers which is suitable for use in a production line comprising assembling stations of any known type, such as "continuous moving", wherein the operators operate on units to be assembled as they move continuously along the line, or "stop and go", wherein the units to be assembled along the line stop at the stations during the execution of the assembly cycle.

According to a preferred feature of the invention, the module for carrying containers is provided for being transported on board an AGV (Automated Guided Vehicle) or for being positioned on a carriage which is movable, either manually or by means of a motorized movement system, in such a way that said module can be positioned according to the production requirements in proximity of a selected assembling station.

The use in a production line of one or more modules of the type indicated above enables improvement of the efficiency with which the operators are supplied with the parts and components that are necessary to them during execution of the working cycle and more in general to improve the logistic of distribution of the parts and components to the various assembly stations.

Furthermore, the module mentioned above enables the operators to work always in comfortable and convenient conditions, without the need to assume postures or make efforts that, if repeated over a prolonged time, may be physically challenging to the operators. This advantage derives primarily from the possibility of actuating the module paternoster conveyor system for positioning any drawer of the model in a predetermined position, preferably a position at a convenient height for the operator. The further possibility of providing guides that force the drawers to tilt forwards and downwards in the pick-up area further favors access to each drawer by the operator. Consequently, the module according to the invention can also have a height considerably higher than that of a man, it being possible for the operator to translate each drawer to a convenient height for being picked-up.

According to a first mode of use, in the case where an assembling station is dedicated to the production of units (e.g., internal-combustion engines or cylinder heads) of a single type, each module can have each of its drawers containing a kit with all the parts or components that the operator must mount in that assembling station on each unit produced. At the end of the working cycle on a specific unit, the paternoster system is actuated for moving a new kit into the position for being picked-up by the operator.

However, it is also possible to envisage that each drawer of the module contains just one component or part of the series of parts or components that are to be assembled on each unit in each working cycle.

In this case, the paternoster system is actuated as the operator mounts the various parts on the same unit, with the advantage of ruling out the possibility of errors in the assembly sequence.

However, the production line according to the invention affords further important advantages in the case of assembling stations prearranged for producing units of different types of models, according to a mix that is a function of the production demands. In this case, according to the mix envisaged of the different types or models to be produced, and consequently according to the succession envisaged of the parts or components that are necessary, it is possible to provide the drawers of the module with parts or components corresponding to the necessary assembly sequence.

The production line according to the invention affords the further advantage of being flexibly adaptable to unexpected situations, such as an alteration of the assembly sequence previously programmed (for instance following up a rejection of a part owing to insufficient quality). In this case, the operator can remedy by actuating the paternoster system for accessing the drawer containing the new component required, without any need to stop the production. The drawers of the module may also be prearranged with more versions of the same component to be assembled that are different from one another as regards the mentions and can be selected according to specific measurements made during the process sequence.

BRIEF DESCRIPTION OF THE DRAWINGS

Further characteristics and advantages of the invention will emerge from the ensuing description with reference to the annexed drawings, which are provided purely by way of non-limiting example, in which.

DETAILED DESCRIPTION

In FIGS. 1-13 reference A generally designates a module for carrying containers included in a production line according to the present invention. The module A is provided with a plurality of containers for carrying parts and for supplying these parts to an operator O assigned to an assembling station in the production line.

Figure 1:
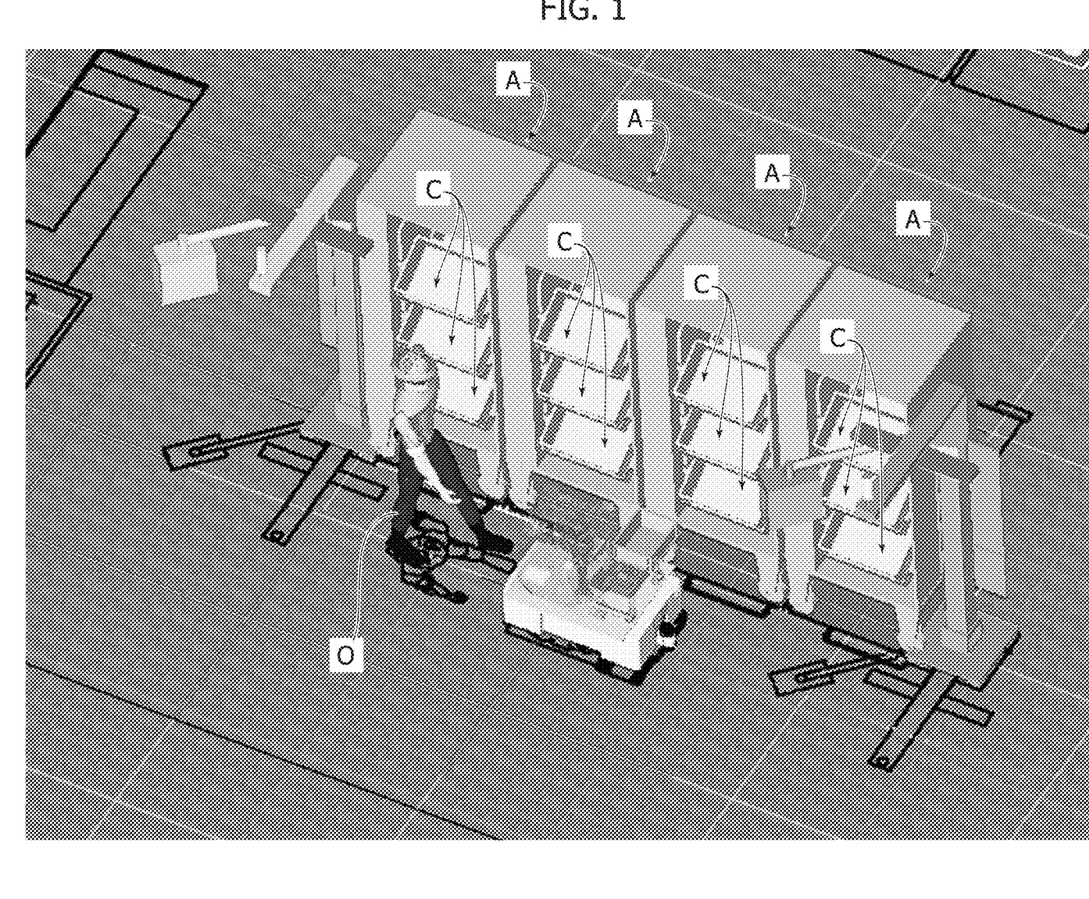
FIG. 1 is a perspective view which shows a plurality of modules for carrying containers according to the present invention which are associated to an assembling station of a production line.
Figure 2:
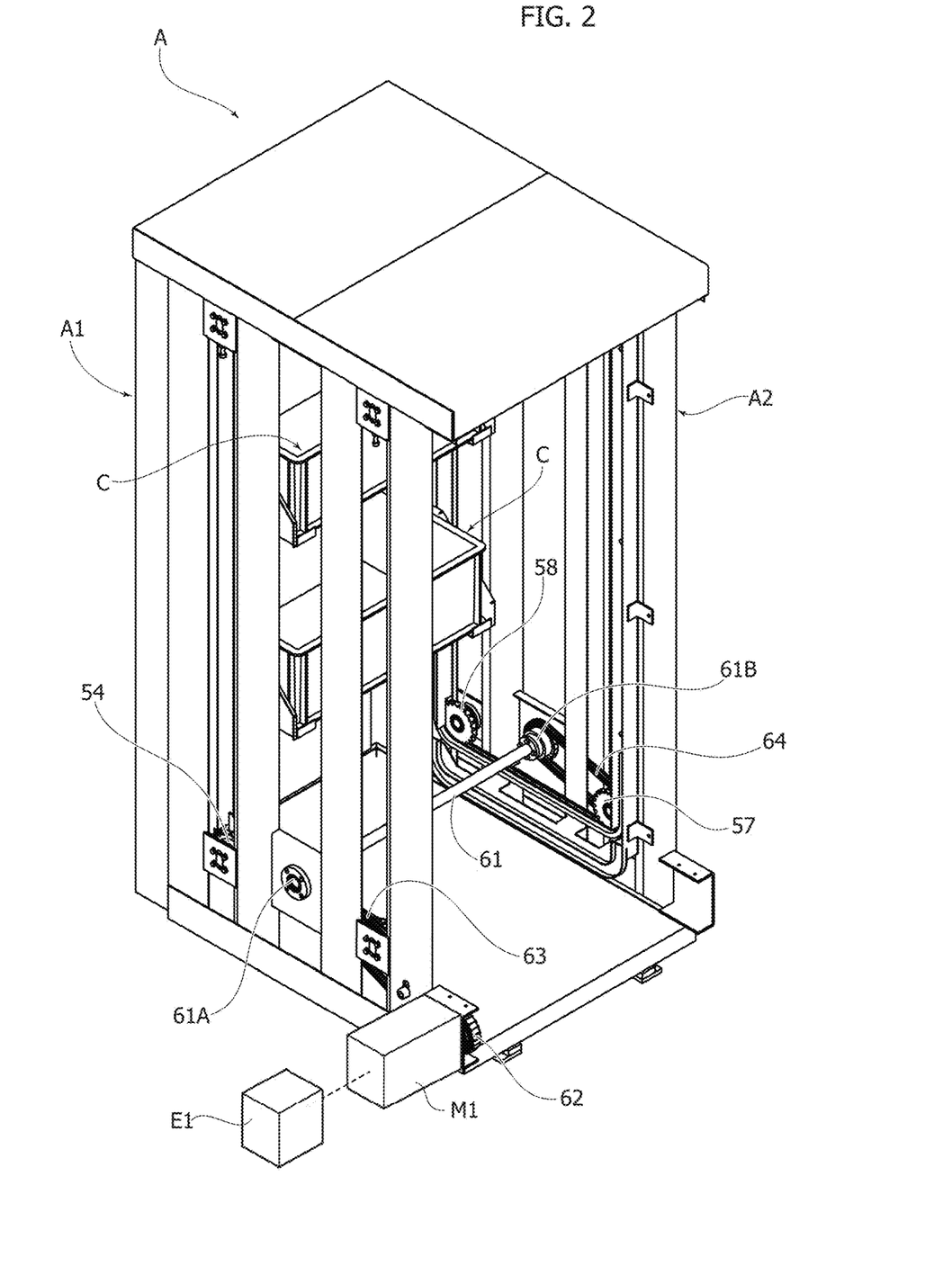
FIGS. 2-3 are respectively a perspective view and a front view of single module for carrying containers of the FIG. 1.
Figure 3:
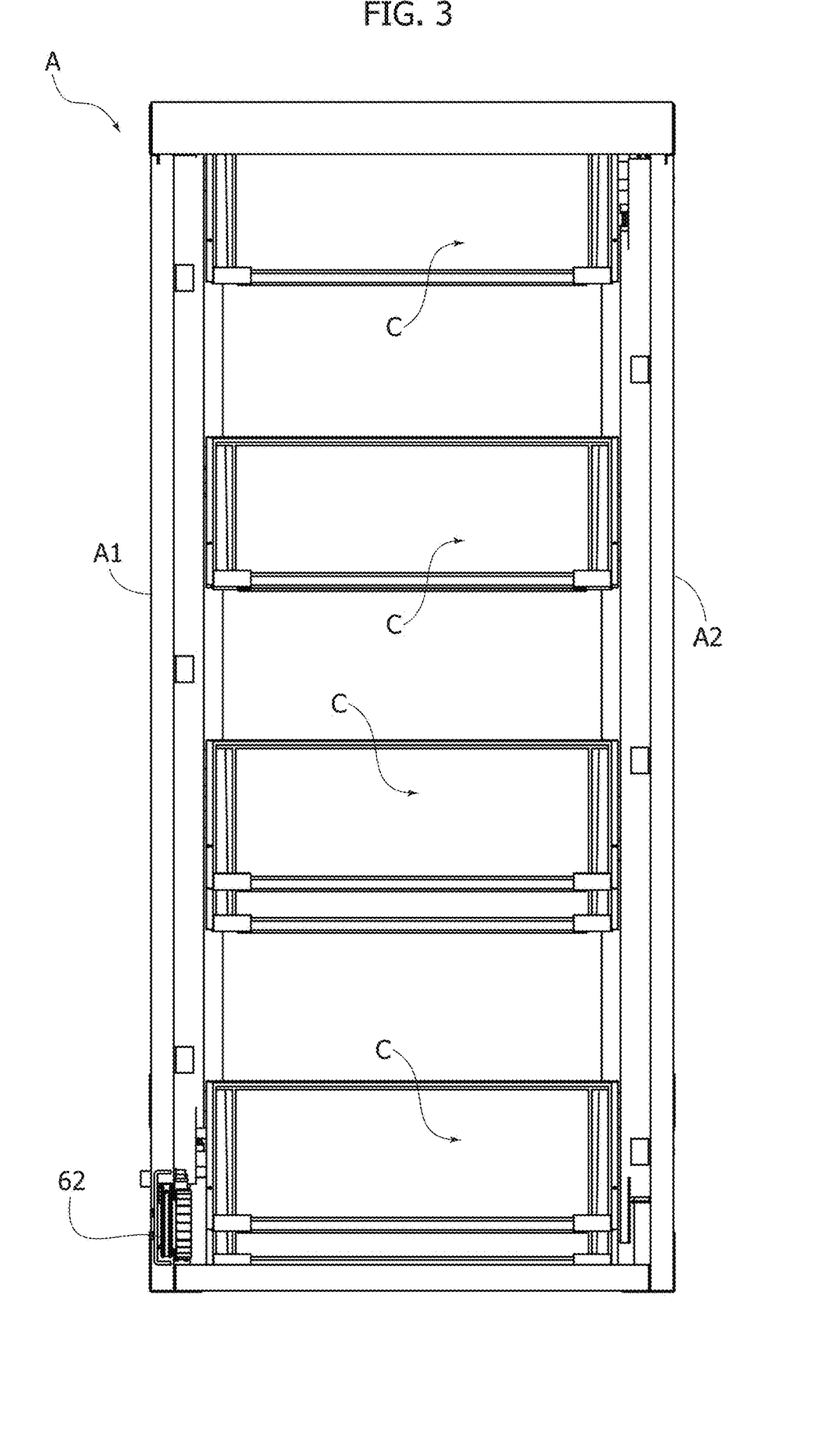

The module for carrying containers A comprises a load-bearing structure with a bottom wall, a top wall and two side walls A1, A2. As illustrated in FIGS. 1, 2, 3, 13, the module for carrying containers A does not have any front wall so as to enable convenient access for the operator O to the contents of the drawers carried by the module A. In order to have a light load-bearing structure, the sidewalls A1, A2 of the module for carrying containers A may also be provided with a configuration of the lattice type (FIG. 2).

According to a fundamental characteristic of the invention, the containers carried by the module A are provided as drawers C and in order to render the movement of the drawers C carried by the module A automated, the plurality of drawers C is associated to a paternoster transport system which includes a chain drive system. As it is also described in the following of the present description, the paternoster transport system is operable for selectively placing each drawer C in a picking position wherein the parts contained therein can be picked-up by an operator O.

According to another important feature of the invention, the chain drive system comprises two closed loop lateral chains 51, 52 each mounted adjacent to one of the lateral walls A1, A2 of the module for carrying containers A, in such a way that the sides of the drawers C are connected to the two lateral chains 51, 52.

The drawers C are arranged according to a fixed pitch along the closed loop path defined by the two lateral chains 51, 52.

Figure 8:
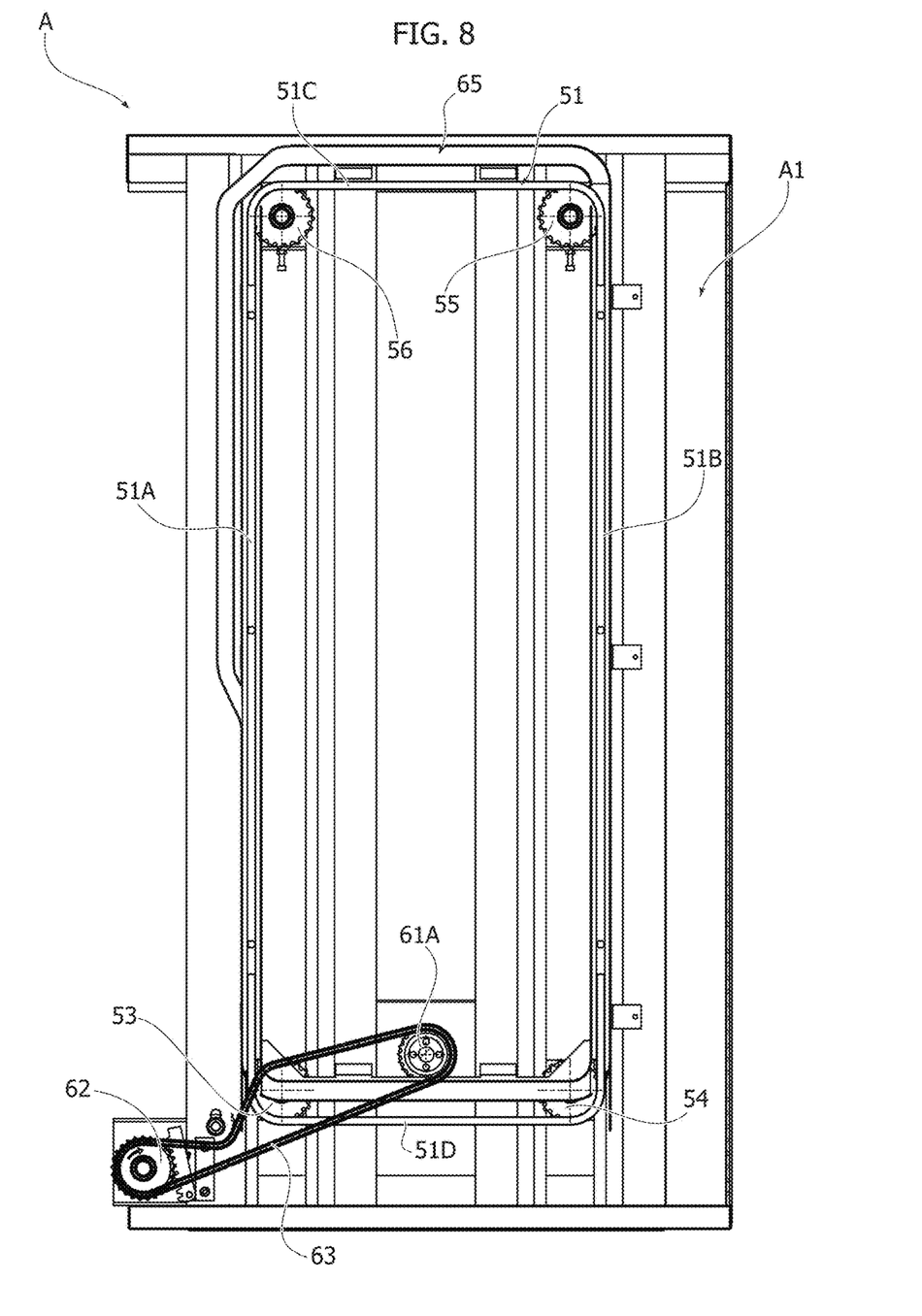
FIGS. 8-9 are each a respective cross-sectional right and left side view of the module for carrying containers shown in FIG. 2.
Figure 9:
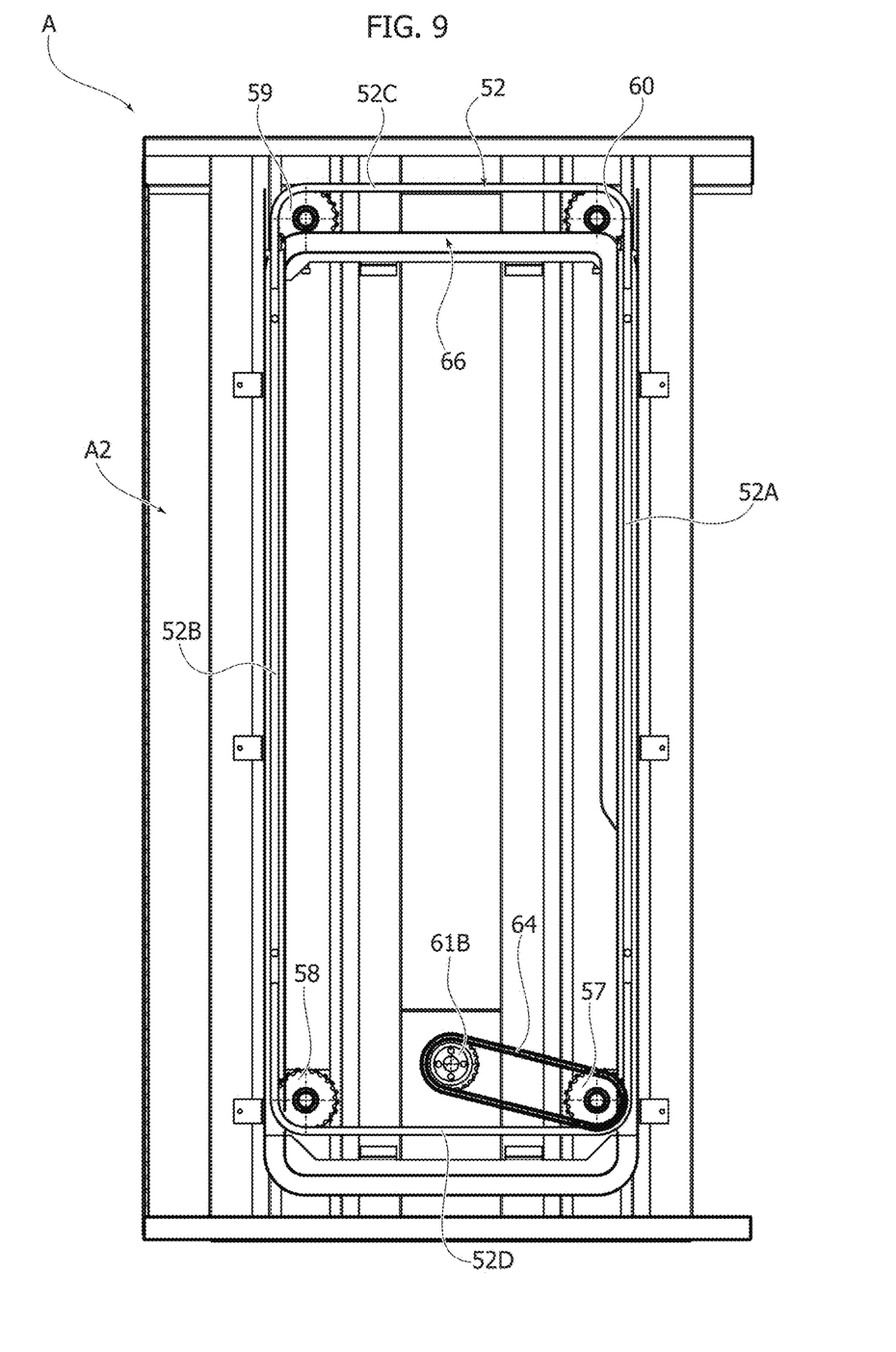

As best seen in FIGS. 8 and 9, each of the two lateral chains 51, 52 has a respective front vertical branch 51A, 52A, a respective rear vertical branch 51B, 52B, a respective top horizontal branch 51C, 52C, and a respective bottom horizontal branch 51D, 52D.

With reference in particular to the perspective view of FIG. 2 and to the side views of FIGS. 8 and 9, each lateral closed loop chain 51, 52 is engaged on four respective chain wheels 53, 54, 55, 56, 57, 58, 59, 60 which are rotatably mounted on the load-bearing structure of the module A. The chain wheels are connected to a drive motor M1 which is electronically-controlled by an electronic control unit E1, provided for example out of the load-bearing structure of the module A. The motor M1 can be for example positioned on a fixed base or on an AGV.

The motor M1 transmits the motion to a first chain wheel 53 of a first lateral chain 51, and a transmission shaft 61 mounted in the proximity of the bottom wall of the load-bearing structure of the module A transmits the motion from the chain wheel 53 of the first lateral chain 51 to a chain wheel 57 of the second lateral chain 52.

More in particular, as illustrated in FIGS. 2, 8, 9, the drive motor M1 actuates an end gear 62, and via a transmission belt 63 the motion is transmitted to the first chain wheel 53. Once again via the belt 63 (FIGS. 2 and 8), the motion is transmitted also to a first end 61A of the transmission shaft 61. The motion is then transmitted to the opposite end 61B of the shaft 61, which is connected, with a transmission belt 64, to the chain wheel 57 of the second lateral chain 52.

Thanks to the structure described above, during an operating step of the working cycle, the drawers C move in an automated way thanks to the movement of the chains 51, 52 imparted by the drive motor M1.

According to an important characteristic of the invention, the production line comprises an electronic control unit E1 for controlling the aforesaid drive motor M1 according to a predetermined program, on the basis of control signals including at least a safety stop signal and a signal which indicates the position of each drawer C along the closed loop path.

As mentioned previously, a plurality of drawers C are mounted with a fixed pitch along the closed loop path defined by the two lateral chains 51, 52.

Figure 4:
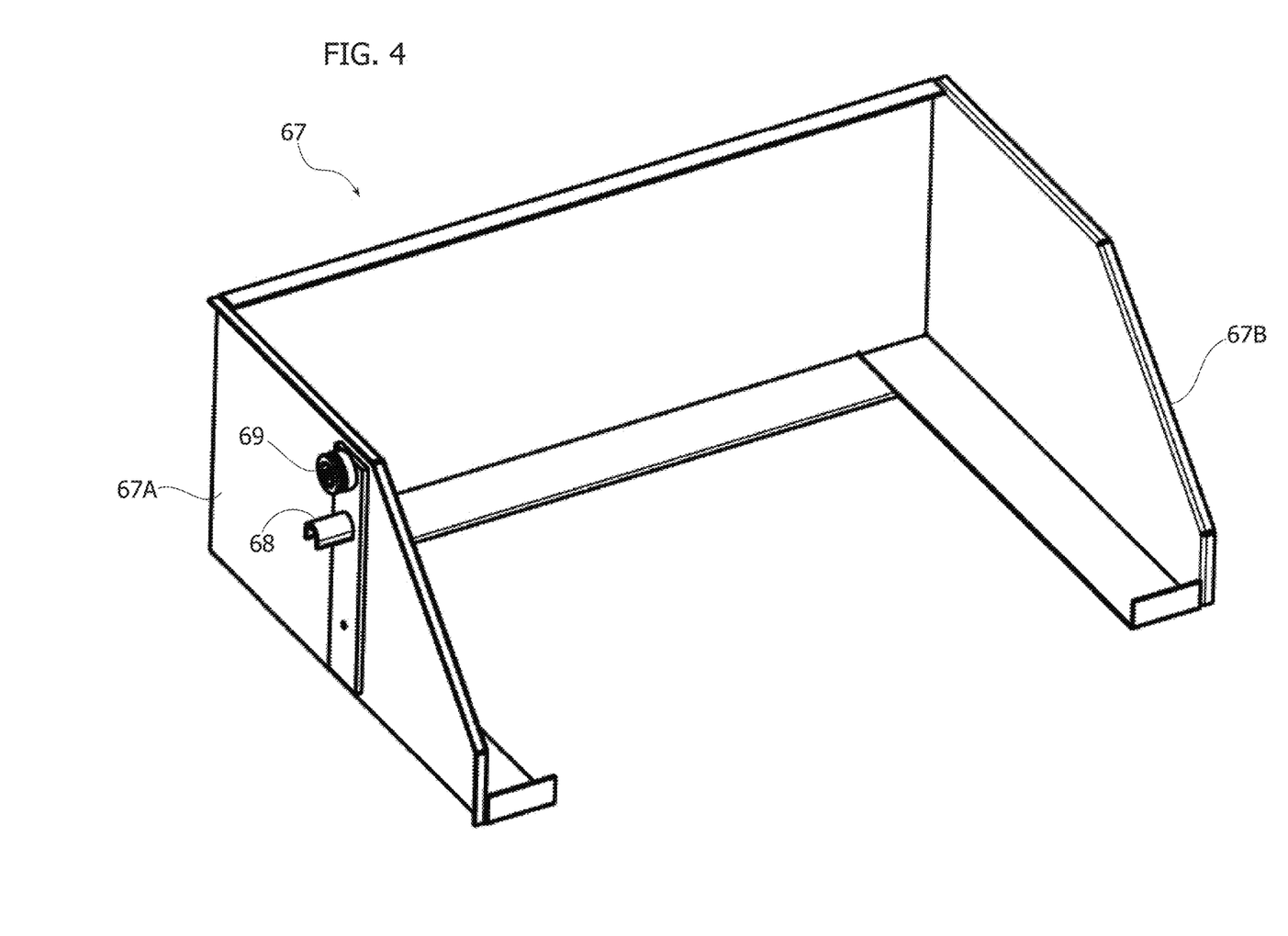
FIGS. 4-6 show perspective views of different embodiments of drawers.
Figure 5:
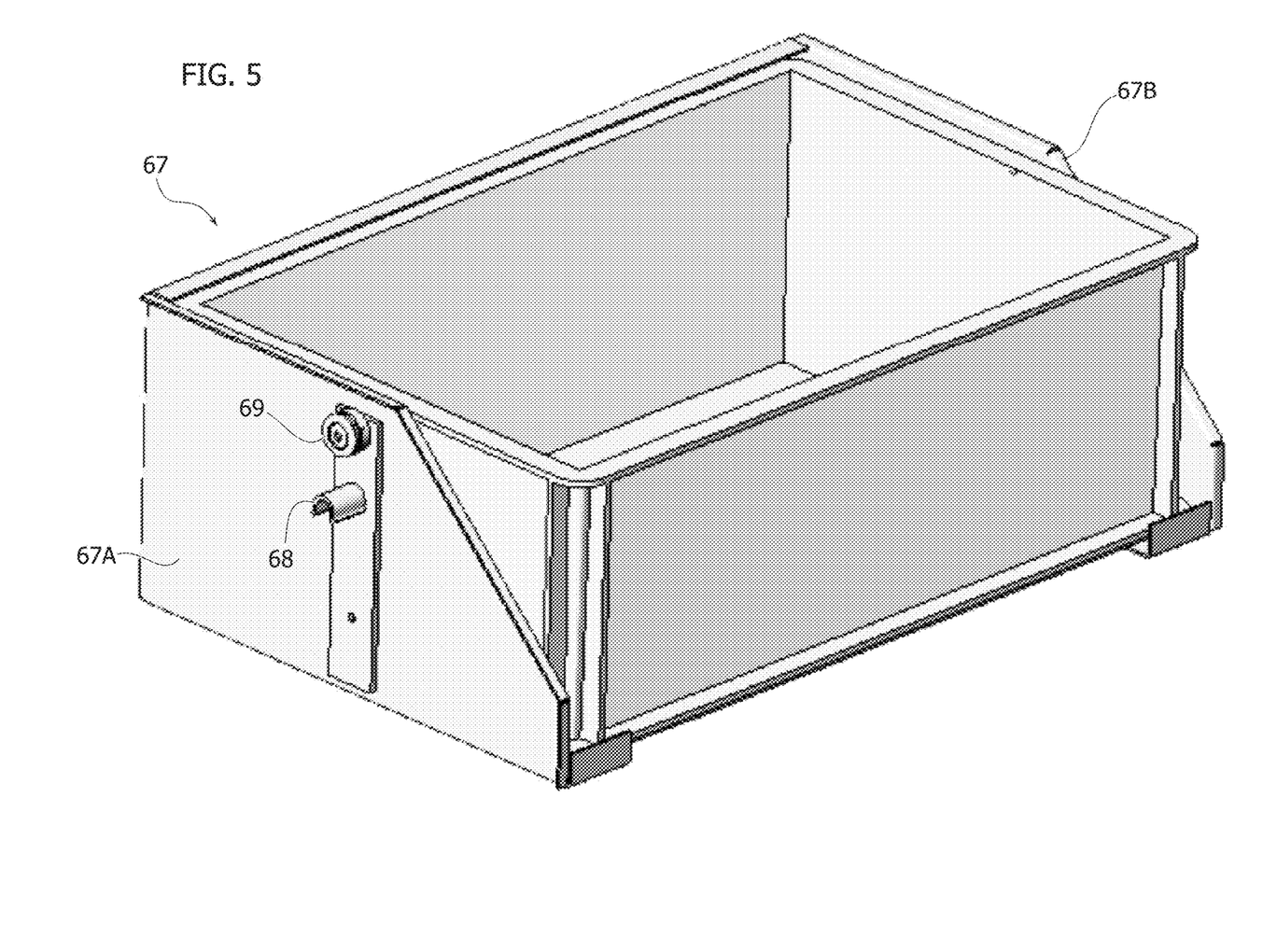
Figure 6:
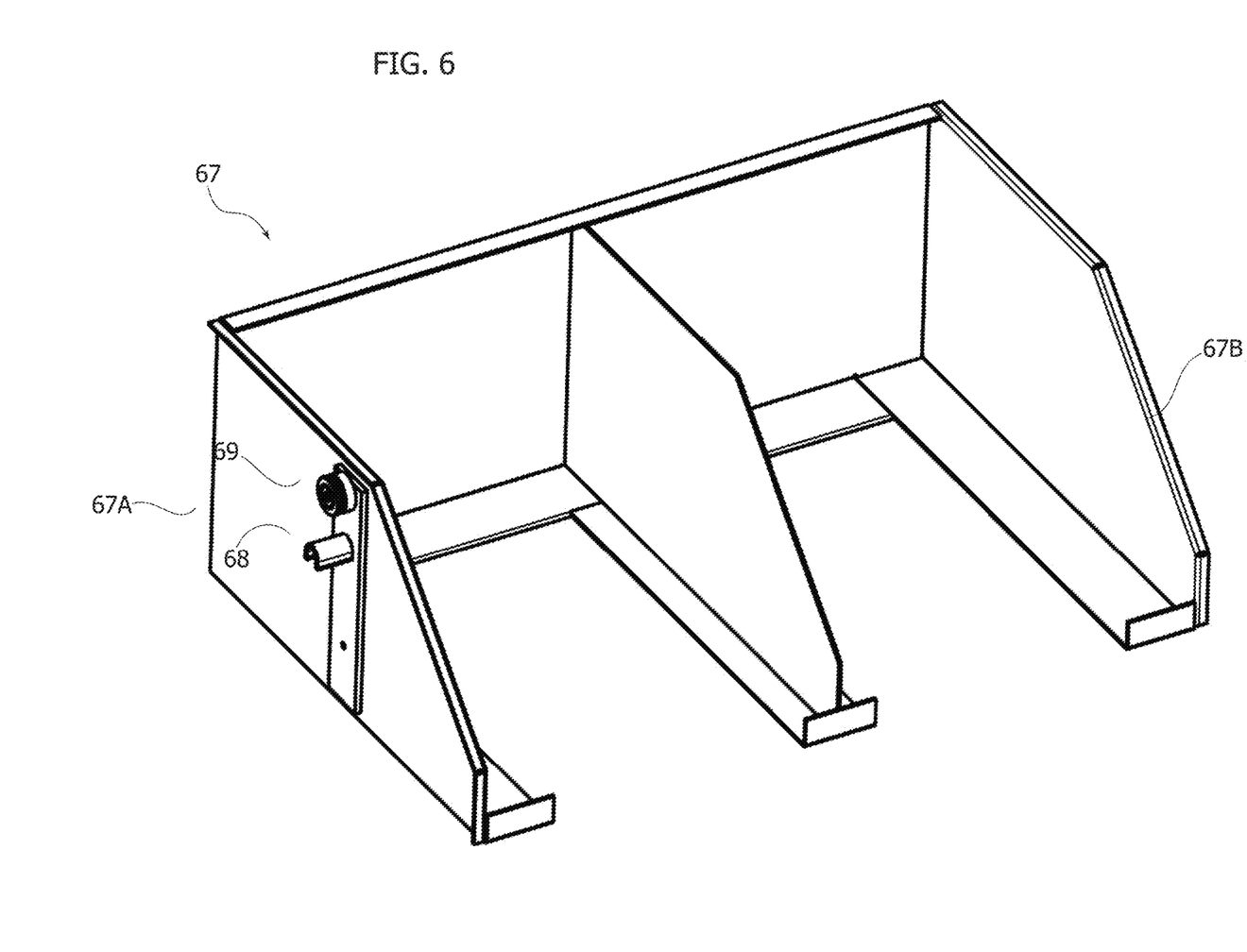
Figure 7:
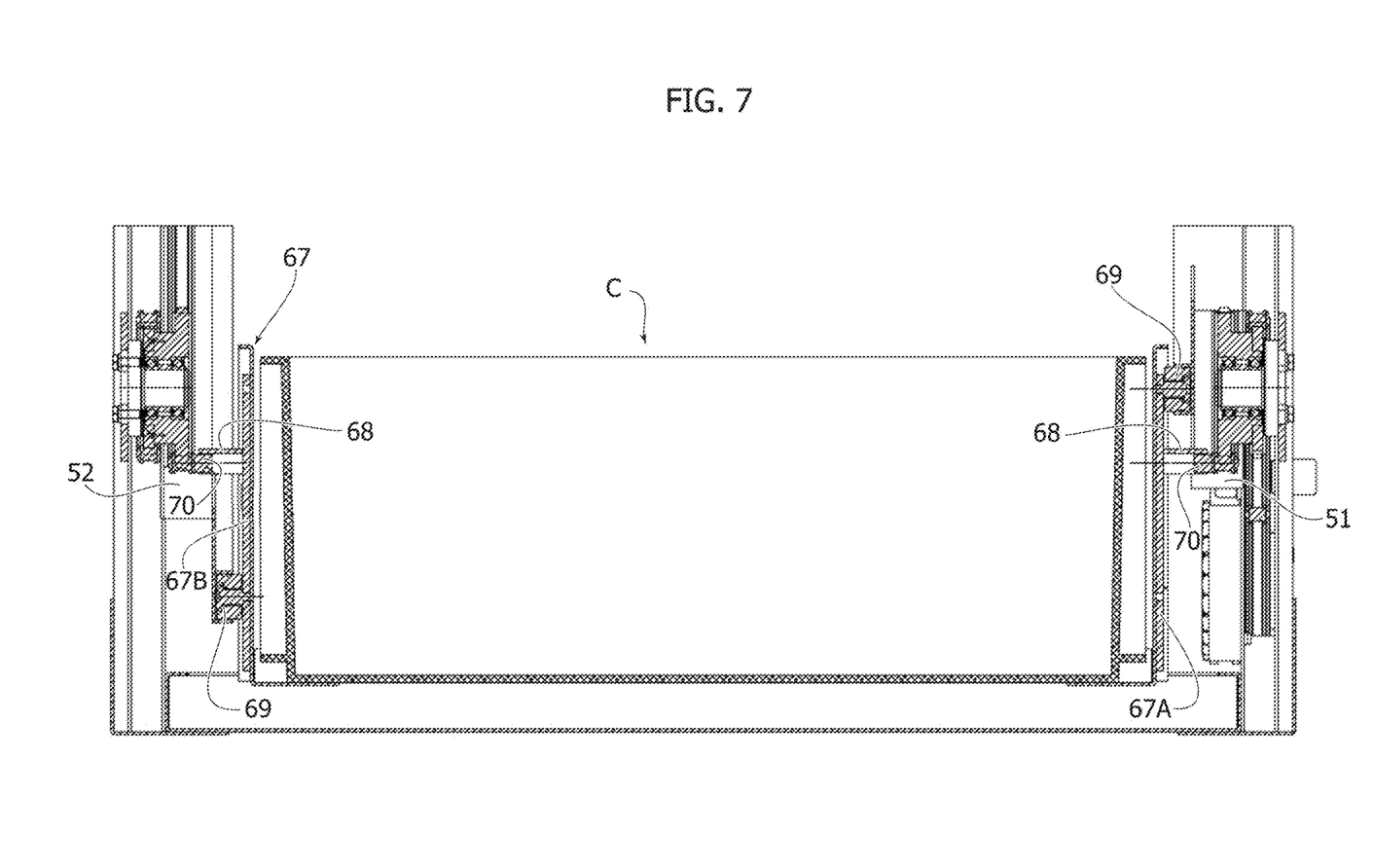
FIG. 7 is a cross-sectional view of a drawer engaged in the module for carrying containers.

As best seen in FIGS. 8 and 9, according to a further important characteristic of the present invention, the module for carrying containers A is provided at its lateral walls A1, A2, not only with the two chains 51, 52, but also with two lateral guide rails 65, 66 that are adapted to be engaged with respective lateral walls 67A and 67B of the drawers C (FIGS. 4-6). Each guide rail 65, 66 is configured according to a closed loop and is mounted close to a respective lateral chain 51, 52.

Figure 13:
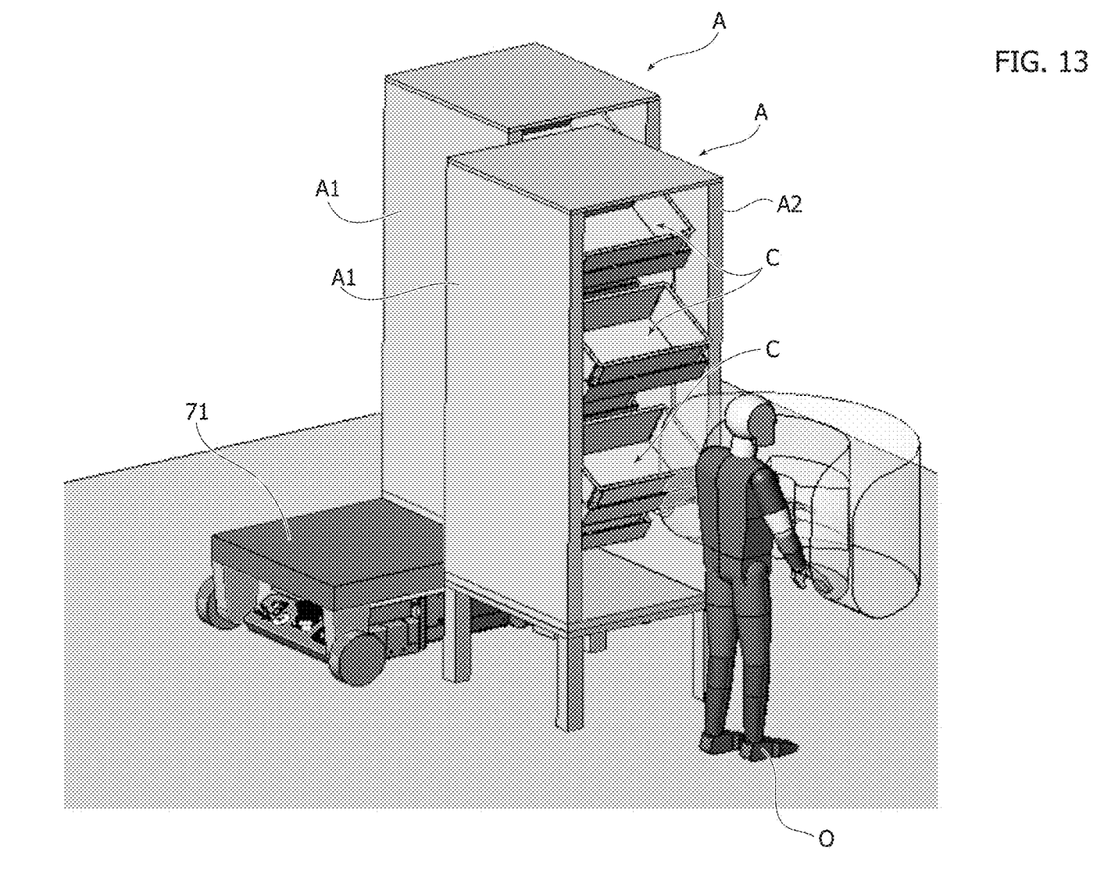
FIG. 13 shows an example of movement of the module for carrying containers of the previous figures in a production environment.

As illustrated in particular in the side views of the module A of FIGS. 8, 9, the two lateral guide rails 65, 66 are not pre-arranged in the same way on the respective lateral wall A1, A2 of the module A, but are instead configured in a way different one from the other. This configuration is defined in such a way that the drawers C maintain a horizontal orientation along the closed loop path defined by the two lateral chains 51, 52, with the exception of a portion of a descent phase along the front vertical branches 51A, 52A of the two chains 51, 52. In this portion, the drawers C are brought to incline forward toward the bottom in order to facilitate access to each drawer C by the operator O (FIG. 13). The configuration of the two guide rails 65, 66 as described above is described more fully in the following of the present description.

With reference to FIGS. 4-6, is now described in detail the configuration of the containers for carrying parts which as previously described are in the form of drawers C. In a preferred embodiment of the invention (FIGS. 4, 5), each drawer C comprises a carrying drawer structure 67 with open bottom, on which is carried a container adapted to contain different parts used by the operator O during a working cycle. The drawer/carrying structure 67 may also be arranged for receiving two containers set alongside one another (FIG. 6). Thanks to the configurations of the drawers C described above, the ways for supplying parts to the drawers C are extremely simple since it is not necessary to slide the entire drawer C out of the paternoster system of the module A to add or remove parts. Once again with reference to FIGS. 4-6 each of the drawers C has two opposite side walls 67A, 67B on which is rigidly mounted a first engagement element 68 and a rotatably mounted roller 69. The first engagement element 68 is pre-arranged for being engaged on a second engagement element 70 (FIG. 7) carried by a respective lateral chain 51, 52 in such a way that each drawer C is carried and moved by the chain drive system, when the drive motor M1 is activated. In this way, as will be described more fully in what follows, it is provided a rise or ascent phase along the rear vertical branch 51B, 52B of the chains 51, 52 and a descent phase along the front vertical branch 51A, 52A of the two chains 51, 52. In the preferred embodiment illustrated in the drawings, the first engagement elements 68 is a tile with semi-circular profile having a radius of curvature sized to enable the drawer to remain engaged on the second engagement element 70 carried by the respective chain 51, 52 also in the descent phase wherein the drawer C is inclined forward toward the operator O (see FIGS. 10-12).

Each of the aforesaid rollers 69 provided on the side walls 67A, 67B of each drawer C is engaged in a respective lateral guide rail 65, 66. As illustrated in the cross-sectional view of FIG. 7, the rollers 69 are provided on each of the two sides of the drawer C in positions that are not symmetrical with respect to one another so as to enable engagement in the respective guide rail 65, 66 provided on the side walls A1, A2 of the cabinet A.

As mentioned previously, the two lateral guide rails 65,66 each provided on the respective lateral wall A1, A2 of the module A are configured in a way different one from the other. With reference to the side view of FIG. 10 of the module A, wherein it is illustrated the descent phase of the drawers C, the guide rail 65 is provided on the respective lateral wall A1 of the module A at a height greater than the height of the lateral guide rail 66 provided on the other lateral wall A2.

Furthermore, once again with reference to FIG. 10 and to the lateral view of the module for carrying containers A of the FIGS. 8, 9, at the portion of descent of the drawer C along the front vertical branches MA, 52A of the chains 51, 52, the guide rail 66 has a portion of front vertical branch set facing the inside of the module A, thus defining a substantially S-shaped path or configuration along which one of the two rollers 69 of the drawers C runs, while the lateral guide rail 65 also has a portion of front vertical branch provided for defining a substantially S-shaped path or configuration in such a way that the final portions of the two front vertical branches of the lateral guide rails 65,66 are aligned respectively to the chains 51, 52.

Figure 10:
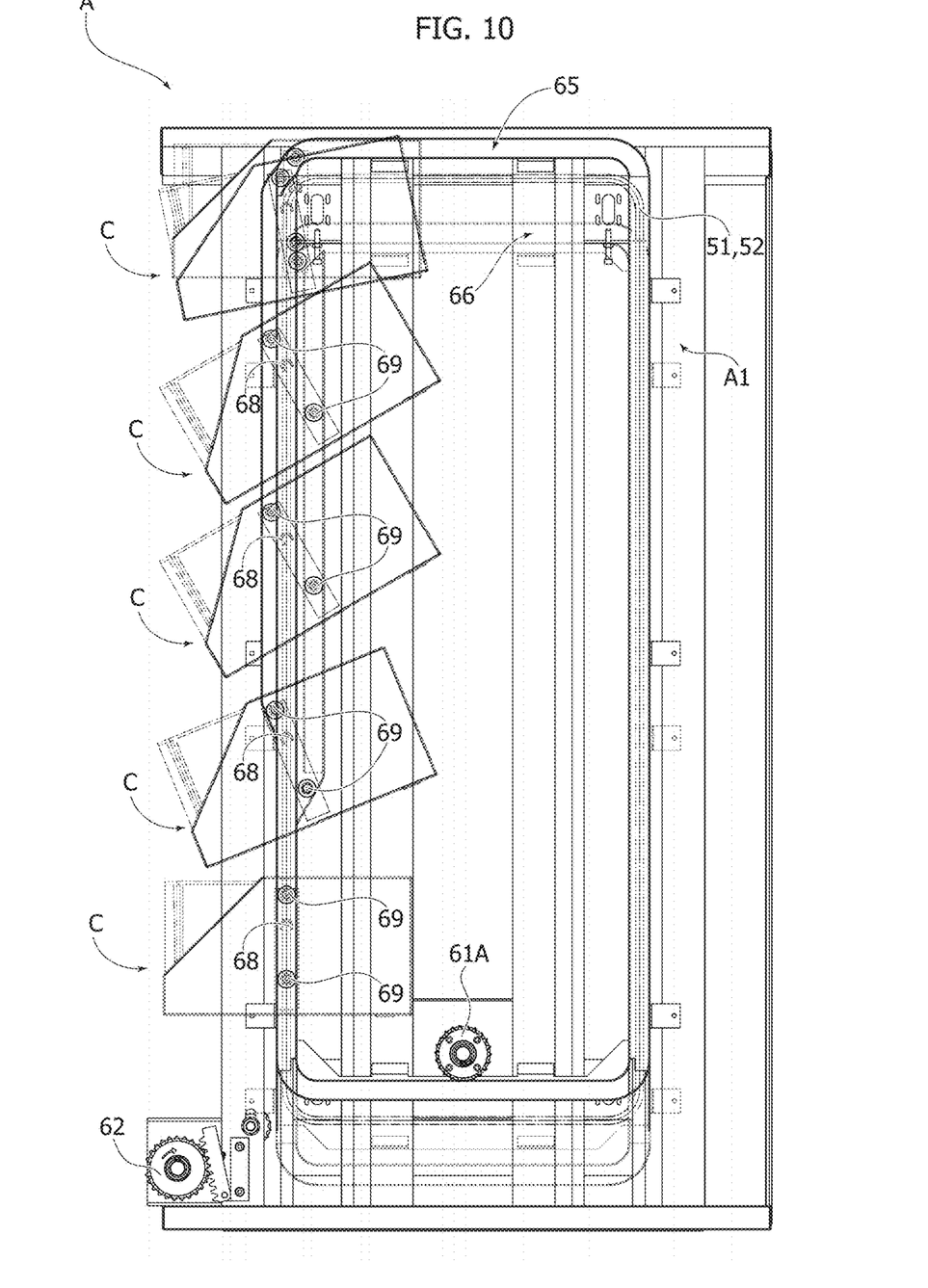
FIG. 10 shows the module for carrying containers with drawers viewed from the side illustrated in the FIG. 8, with some drawers engaged in the respective guides and chains.
Figure 11:
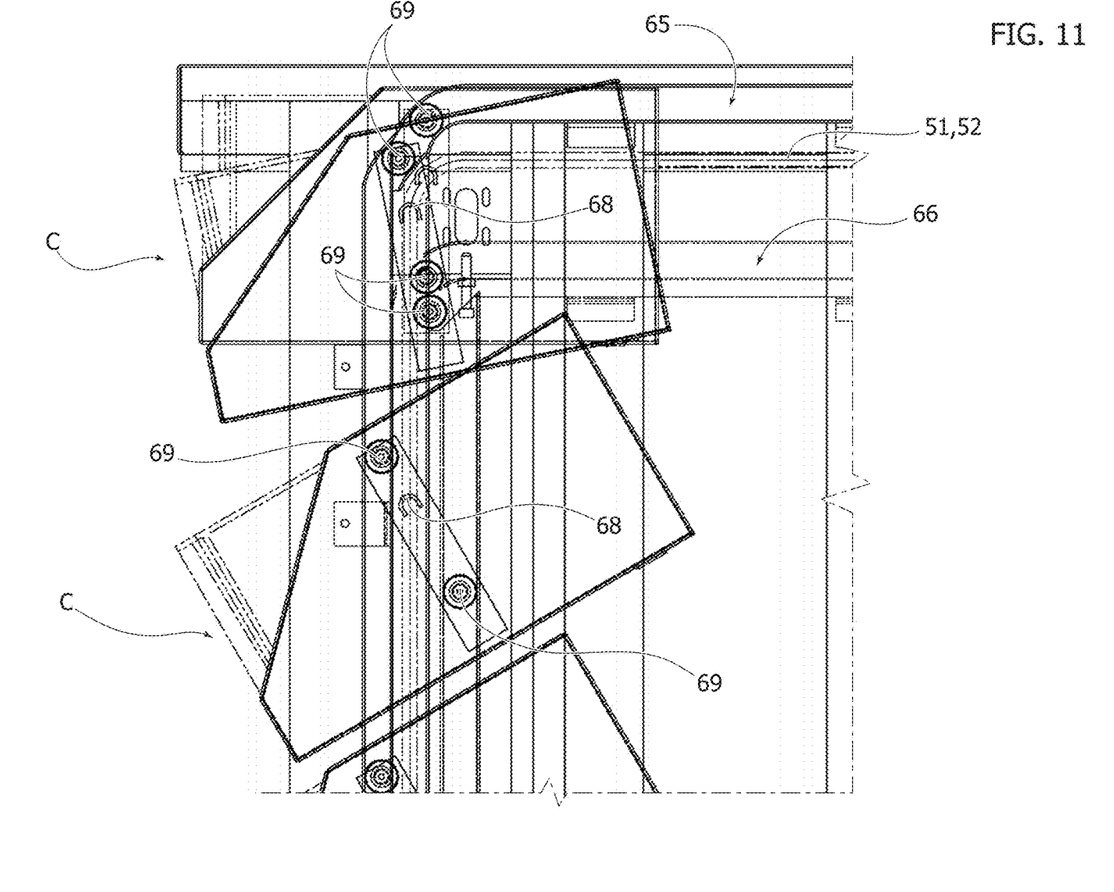
FIGS. 11, 12 are views at an enlarged scale of some details illustrated in FIG. 10.
Figure 12:
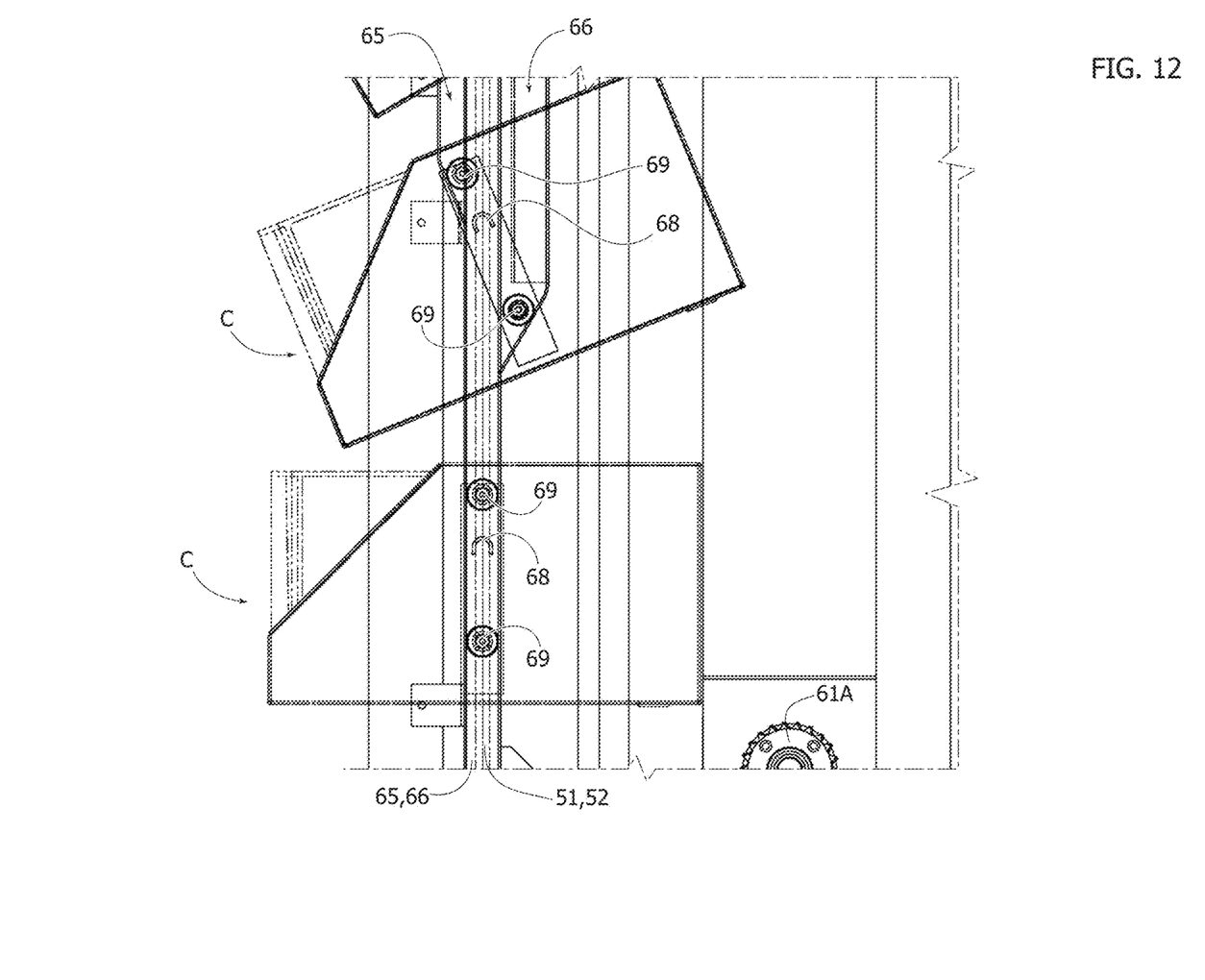

As already mentioned previously, thanks to this configuration of the two lateral guide rails 65, 66, the drawers C incline during the descent phase as illustrated in FIGS. 10-12, enabling convenient access for the operator O to the contents of the drawers C.

Preferably, in order to enable traceability of the contents of the drawers C, each drawer C is pre-arranged to have within it a microchip (not illustrated in the drawings) connected to the aforesaid electronic control unit, for reading and/or writing information regarding movement of objects contained in the drawers C.

In the following of the present description, operation of the production line according to the present invention will now be described. Thanks to the structure described above, via activation of the aforesaid drive motor M1, a movement of the paternoster conveyor system is obtained, including the chain-transmission system that moves the drawers C arranged with a fixed pitch in the module A along the closed loop path defined by the two lateral chains 51, 52. The motor M1 drives the first chain wheel 53, which in turn moves the first lateral chain 51. The transmission shaft 61 mounted in the proximity of the bottom wall of the module A transmits the motion to a second chain wheel 57, which in turn moves the second lateral chain 52. The drawers hence move with a continuous movement that envisages a rise or ascent phase along the rear vertical branches 51B, 52B of the two chains 51, 52 and the descent phase along the front vertical branches 51A, 52A facing the operator O. Thanks to the configuration of the two lateral guide rails 65, 66 in which the rollers 69 are engaged, in the descent phase, the drawers C incline in the direction of the operator O assigned to one assembling station 2 of the production line (FIGS. 10-13, thus enabling the operator O to access conveniently to the contents of the drawers C).

The working cycle programmed by the aforesaid electronic control E1 unit may envisage that the drawers set themselves in predetermined positions along the closed loop path, or as may envisage that the operator O activates manually movement of the drawers C along the closed loop path.

According to an important characteristic of the present invention which is illustrated in the FIG. 13, the module for carrying containers A is moreover provided for being conveniently transported by an AGV 71, in such a way that the module A may be freely positionable according to production requirements in the proximity of any selected one of the assembling stations 2 of the production line.

Illustrated by way of example in FIG. 13 is the case where the module A is transferred from a stationary support above the AGV 71. Alternatively, the module A can be transferred from the stationary support to a movable carriage, either manually or by means of any motor-driven movement system.

Thanks to the characteristics indicated above, the production line according to the present invention enables to obtain high efficiency as regards how the operators are supplied with the parts and components that are necessary to them during execution of a working cycle and it improves the logistic of distribution of the aforesaid parts and components to the various assembling station in an industrial plant. Of course, without prejudice to the principle of the invention, the details of construction and the embodiments may vary widely with respect to what has been described herein purely by way of example, without thereby departing from the scope of the present invention.

What is claimed is:

1. A production line comprising:
   an assembly station;
   a module operable to selectively supply parts to an operator in the assembly station, the module further comprising:
      a first side wall;
      a second side wall connected to the first side wall;
      a paternoster conveyor including a first closed loop lateral chain connected to the first side wall and a second closed loop lateral chain connected to the second side wall, the first and second closed loop lateral chains defining a closed-loop path;
      a first lateral guide rail connected to the first side wall and a second lateral guide rail connected to the second guide wall, each of the first and the second lateral guide rails defining a step of descent positioned toward a front branch of the closed-loop path and a step of ascent positioned toward a rear branch of the closed-loop path; and a plurality of drawers operable to support parts to be assembled, each of the plurality of drawers further comprising:
  opposing lateral sidewalls;
  a first engagement element connected to each of the opposing lateral sidewalls, each first engagement element engages with a second engagement element connected to a respective one of the first and the second closed loop lateral chains thereby positioning each drawer in a fixed pitch relative to one another; and
  a wheel connected to each of the opposing lateral sidewalls positioned at different vertical heights from one another, each wheel engages a respective one of the first or the second lateral guide rails, the plurality of drawers selectively positioned relative to the assembly station to selectively supply the parts to the operator in the assembly station for removal from the drawer.

2. The production line according to claim 1, wherein each drawer further comprises a carrying drawer structure defining an open bottom.

3. The production line according to claim 1, wherein said production line further comprises one or more automatic guided vehicles (AGVs) operable to selectively engage and transport said module to a predetermined position proximate the assembly station.

4. The production line according to claim 1, wherein said production line further comprises a carriage operable to selectively engage and transport said module to a predetermined position proximate the assembly station.

5. The production line according to claim 4, wherein said carriage is movable by one of manual movement or a motorized movement system engaged with the carriage.

6. The production line according to claim 1, wherein said module further comprises a bottom wall and a top wall each connected to the first side wall and the second side wall, the top wall, the bottom wall and the first and the second side walls defining a front access opening to enable the operator access to the parts positioned in said drawers.

7. The production line of claim 1 wherein the module further comprises:
  a drive motor in operable connection to one of the first or the second closed loop lateral chain to selectively move the connected one of the first or the second closed loop chain to selectively move and position the plurality of drawers at the assembly station; and
  an electronic control unit in electronic communication with the drive motor to selectively energize the drive motor to move the connected one of the first or the second closed loop lateral chain.

8. The production line of claim 1 wherein the first and the second lateral guide rails respective step of descent defines a S-configuration, wherein on movement of the respective drawer wheels through the respective guide rail step of descent, a portion of the drawer facing the assembly station moves angularly downward with respect to the assembly station to provide increased access of the parts to the operator.

9. The production line according to claim 7, wherein each drawer further comprises a microchip in communication with said electronic control unit, the microchip operable to read/write information relative to traceability of the parts contained in the drawers.

10. The production line of claim 7 wherein the paternoster conveyor further comprises:
  a chain wheel engaged with the one of the first or the second closed loop lateral chain and the drive motor, the chain wheel operable to transmit movement of the drive motor to the engaged one of the first or the second closed loop lateral chain.

11. The production line of claim 10 further comprising a transmission shaft engaged with the chain wheel and the other of the first or the second closed loop lateral chain, the transmission shaft operable to transmit movement of the chain wheel to the other of the first or the second closed loop lateral chain.

* * * * *